United States Patent
Fukuoka et al.

(10) Patent No.: US 9,553,309 B2
(45) Date of Patent: Jan. 24, 2017

(54) SILICON OXIDE PARTICLES, MAKING METHOD, LITHIUM ION SECONDARY BATTERY, AND ELECTROCHEMICAL CAPACITOR

(71) Applicant: Shin-Etsu Chemical Co., Ltd., Tokyo (JP)

(72) Inventors: Hirofumi Fukuoka, Annaka (JP); Susumu Ueno, Annaka (JP); Koichiro Watanabe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/009,238

(22) Filed: Jan. 28, 2016

(65) Prior Publication Data

US 2016/0149214 A1    May 26, 2016

Related U.S. Application Data

(62) Division of application No. 13/894,570, filed on May 15, 2013, now Pat. No. 9,281,129.

(30) Foreign Application Priority Data

May 16, 2012   (JP) .................. 2012-112405

(51) Int. Cl.
| | |
|---|---|
| H01M 4/00 | (2006.01) |
| H01M 4/48 | (2010.01) |
| H01G 9/008 | (2006.01) |
| H01M 4/134 | (2010.01) |
| H01M 4/1395 | (2010.01) |
| H01M 4/36 | (2006.01) |
| H01M 10/0525 | (2010.01) |
| H01G 11/30 | (2013.01) |
| H01M 4/38 | (2006.01) |
| H01M 4/02 | (2006.01) |

(52) U.S. Cl.
CPC ............ *H01M 4/483* (2013.01); *H01G 9/008* (2013.01); *H01G 11/30* (2013.01); *H01M 4/134* (2013.01); *H01M 4/1395* (2013.01); *H01M 4/366* (2013.01); *H01M 4/38* (2013.01); *H01M 10/0525* (2013.01); *H01M 2004/021* (2013.01); *H01M 2004/027* (2013.01); *Y02E 60/122* (2013.01); *Y02E 60/13* (2013.01)

(58) Field of Classification Search
CPC ...... H01M 4/134; H01M 4/386; H01M 4/483; H01M 4/366; H01M 4/624; H01M 4/1395; H01M 4/04; H01M 4/0402; H01M 4/0471; H01M 4/38; H01M 10/0525; H01M 2004/021; H01M 2004/027; H01G 9/008; H01G 11/30; Y02E 60/112; Y02E 60/13

See application file for complete search history.

(56) References Cited

U.S. PATENT DOCUMENTS

| | | | |
|---|---|---|---|
| 5,395,711 A | 3/1995 | Tahara et al. | |
| 5,478,671 A | 12/1995 | Idota | |
| 6,066,414 A | 5/2000 | Imoto et al. | |
| 7,358,011 B2 * | 4/2008 | Fukuoka | H01M 4/0428 |
| | | | 429/128 |
| 7,955,581 B2 * | 6/2011 | Kogetsu | C01B 33/113 |
| | | | 423/325 |
| 2006/0060510 A1 | 3/2006 | Bhan | |
| 2010/0243964 A1 | 9/2010 | Lee et al. | |
| 2011/0159368 A1 | 6/2011 | Hirose et al. | |
| 2013/0303658 A1 * | 11/2013 | Katusic | B82Y 30/00 |
| | | | 523/210 |
| 2013/0344237 A1 | 12/2013 | Guo | |

FOREIGN PATENT DOCUMENTS

| | | |
|---|---|---|
| CN | 102110853 A | 6/2011 |
| JP | 2997741 B2 | 1/2000 |
| JP | 3008228 B2 | 2/2000 |
| JP | 3242751 B2 | 12/2001 |
| JP | 2004-349057 A | 12/2004 |
| JP | 3846661 B2 | 11/2006 |
| JP | 3918311 B2 | 5/2007 |
| JP | 2011-142021 A | 7/2011 |

OTHER PUBLICATIONS

Office Action issued in the corresponding Chinese Patent Application No. 201310289118.6 on May 4, 2016.
Offer of Information (third party submission) submitted in the corresponding Japanese Patent Application No. 2013-090115 on Dec. 7, 2015.
Office Action issued in the corresponding Japanese Patent Application No. 2013-090115 on Jan. 19, 2016.

\* cited by examiner

*Primary Examiner* — Raymond Alejandro
(74) *Attorney, Agent, or Firm* — Birch, Stewart, Kolasch & Birch, LLP

(57) ABSTRACT

Silicon oxide particles each comprising an inner portion having an iron content of 10-1,000 ppm and an outer portion having an iron content of up to 30 ppm are suitable as negative electrode active material in nonaqueous electrolyte secondary batteries. Using a negative electrode comprising the silicon oxide particles as active material, a lithium ion secondary battery or electrochemical capacitor having a high capacity and improved cycle performance can be constructed.

4 Claims, 1 Drawing Sheet

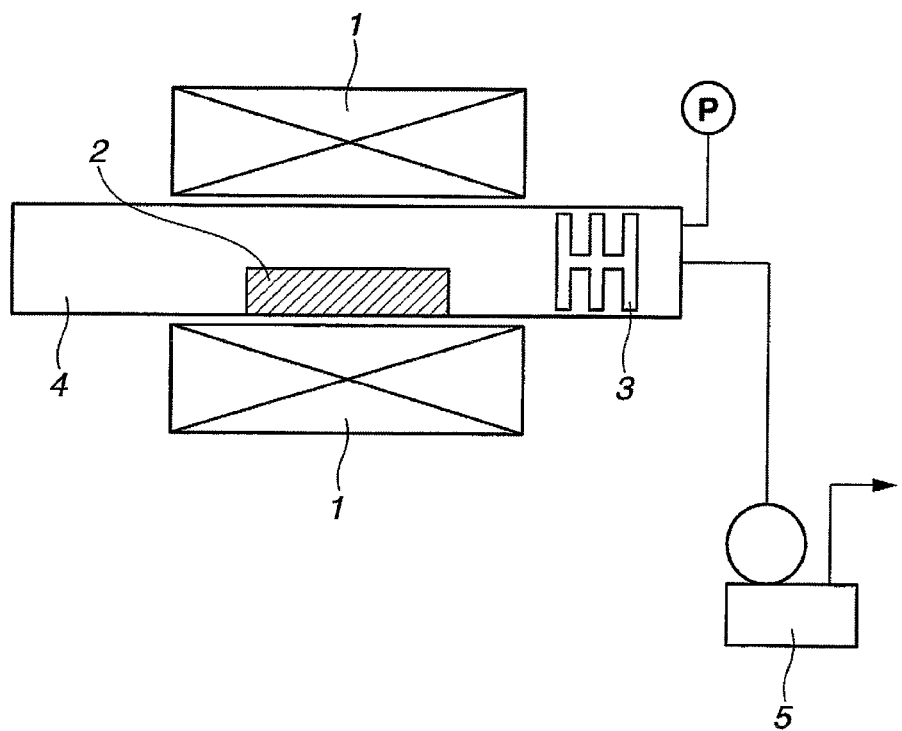

SILICON OXIDE PARTICLES, MAKING METHOD, LITHIUM ION SECONDARY BATTERY, AND ELECTROCHEMICAL CAPACITOR

CROSS-REFERENCE TO RELATED APPLICATIONS

This application is a Divisional of co-pending application Ser. No. 13/894,570 filed on May 15, 2013, which claims priority under 35 U.S.C. §119(a) to Patent Application No. 2012-112405 filed in Japan on May 16, 2012. All of the above applications are hereby expressly incorporated by reference into the present application.

TECHNICAL FIELD

This invention relates to silicon oxide particles for use as negative electrode active material in lithium ion secondary batteries and electrochemical capacitors, a method of preparing the same, a lithium ion secondary battery, and an electrochemical capacitor.

BACKGROUND ART

In conjunction with the recent rapid advances of portable electronic equipment and communications instruments, non-aqueous electrolyte secondary batteries having a high energy density are strongly demanded from the aspects of cost, size and weight reductions. Approaches known in the art to increase the capacity of such nonaqueous electrolyte secondary batteries include, for example, use as negative electrode material of oxides of B, Ti, V, Mn, Co, Fe, Ni, Cr, Nb, and Mo and composite oxides thereof (Patent Documents 1 and 2); application as negative electrode material of wherein x≥50 at % and M=Ni, Fe, Co or Mn which is obtained by quenching from the melt (Patent Document 3); use as negative electrode material of silicon oxide (Patent Document 4); and use as negative electrode material of $Si_2N_2O$, $Ge_2N_2O$ or $Sn_2N_2O$ (Patent Document 5).

Among others, silicon oxide is represented by $SiO_x$ wherein x is slightly greater than the theoretical value of 1 due to oxide coating, and is found on X-ray diffractometry analysis to have the structure that nano-size silicon ranging from several to several tens of nanometers is finely dispersed in silica. Silicon oxide offers a greater battery capacity than the currently available carbon by a factor of 5 or 6 on a weight basis and relatively good cycle performance due to a less volume expansion. For these reasons, batteries using silicon oxide as the negative electrode material are regarded fully effective for use in portable electronic equipment such as mobile phones, lap-top computers and tablets. When the automotive application is considered, however, these batteries are insufficient in cycle performance and expensive.

CITATION LIST

Patent Document 1: JP 3008228
Patent Document 2: JP 3242751
Patent Document 3: JP 3846661
Patent Document 4: JP 2997741 (U.S. Pat. No. 5,395,711)
Patent Document 5: JP 3918311

DISCLOSURE OF INVENTION

As compared with the currently available carbonaceous active material, the silicon oxide-based active material is expensive and inferior in cycle performance. A further improvement in battery performance of the silicon oxide-based active material is desired. An object of the invention is to provide silicon oxide particles which are improved in cycle performance while maintaining the high battery capacity and low volume expansion of silicon oxide, so that the particles are effective as active material in negative electrode material for nonaqueous secondary batteries; a method of preparing the silicon oxide particles; and a nonaqueous electrolyte secondary battery having a negative electrode using the silicon oxide particles.

With a focus on silicon oxide as a negative electrode active material which surpasses the battery capacity of the currently available carbon material, the inventors worked for a further improvement in battery performance and a cost reduction. It has been found that battery performance is affected by the distribution and content of iron in silicon oxide particles, that silicon oxide particles with better properties are relatively readily obtained by limiting the distribution and content of iron to a specific range, and that using such particulate silicon oxide as negative electrode active material, a nonaqueous electrolyte secondary battery having a high capacity and improved cycle performance can be constructed.

In one aspect, the invention provides silicon oxide particles for use as negative electrode active material in non-aqueous electrolyte secondary batteries, each comprising an inner portion having an iron content of 10 to 1,000 ppm and an outer portion having an iron content of up to 30 ppm. Preferably, the silicon oxide particles have an average particle size of 0.1 to 30 μm and a BET specific surface area of 0.5 to 30 $m^2/g$.

In a second aspect, the invention provides a lithium ion secondary battery comprising a positive electrode, a negative electrode, and a lithium ion-conducting nonaqueous electrolyte, the negative electrode comprising the silicon oxide particles defined above as negative electrode active material.

In a third aspect, the invention provides an electrochemical capacitor comprising a positive electrode, a negative electrode, and a conductive electrolyte, said negative electrode comprising the silicon oxide particles defined above as negative electrode active material.

In a fourth aspect, the invention provides a method for preparing silicon oxide particles for use as negative electrode active material in non-aqueous electrolyte secondary batteries, comprising the steps of providing a feed material capable of generating SiO gas and having an iron content of 100 to 20,000 ppm, heating the feed material in an inert gas under normal or reduced pressure at a temperature in the range of 1,100 to 1,600° C. to generate a SiO gas, cooling the gas for deposition, and grinding the deposit in a grinding machine devoid of iron contamination. Typically, the feed material is a mixture of a silicon dioxide powder and a metallic silicon powder.

ADVANTAGEOUS EFFECTS OF INVENTION

Using a negative electrode comprising the silicon oxide particles of the invention as negative electrode active material, a lithium ion secondary battery or electrochemical capacitor having a high capacity and improved cycle performance can be constructed. The method of preparing silicon oxide particles is simple and lends itself to the manufacture on an industrial scale. As a consequence, nonaqueous electrolyte secondary batteries can be manufactured at low cost.

BRIED DESCRIPTION OF DRAWINGS

The only figure, FIG. 1 schematically illustrates a horizontal tubular furnace used in the preparation of silicon oxide particles in one embodiment of the invention.

DESCRIPTION OF EMBODIMENTS

As used herein, the term "ppm" is parts by weight per million parts by weight.

One embodiment of the invention is silicon oxide particles for use as negative electrode active material in nonaqueous electrolyte secondary batteries, wherein an iron content of the particle inner portion is 10 to 1,000 ppm by weight, and an iron content of particle outer portion is up to 30 ppm by weight. Also contemplated herein is a negative electrode active material comprising the silicon oxide particles. A nonaqueous electrolyte secondary battery using the silicon oxide particles as active material in its negative electrode may be embodied as a lithium ion secondary battery or electrochemical capacitor having a high capacity and improved cycle performance. Although the ground is not yet well understood, it is presumed that the inclusion of iron in the particle inner portion in a specific range causes a change to the crystalline structure so that the volume change associated with occlusion and release of lithium ions is suppressed.

The iron content of the particle inner portion is 10 to 1,000 ppm. If the inner iron content is less than 10 ppm, there is a tendency that the above effect is not exerted and cycle performance is degraded. Inversely, if the inner iron content exceeds 1,000 ppm, which means that the content of iron as impurity is too high, the charge/discharge capacity is reduced. Preferably the inner iron content is 20 to 800 ppm, more preferably 30 to 700 ppm.

The iron content of the particle outer portion is up to 30 ppm, preferably up to 20 ppm, and more preferably up to 10 ppm. Desirably, the outer iron content is as low as possible and even equal to 0 ppm. As long as the outer iron content is up to 30 ppm, a nonaqueous electrolyte secondary battery, typically lithium ion secondary battery, having a negative electrode using the particles as active material has a minimized probability of ignition accidents due to short-circuiting, leading to higher safety.

The iron contents of inner and outer portions of particles are values measured as follows.

(1) Total Fe Amount of Particles

The total Fe content of particles is measured by adding 50 wt % of hydrofluoric acid to a powder sample. Once reaction begins, 50 wt % of nitric acid is further added. The liquid is heated at 200° C. until complete melting. The liquid is analyzed by ICP-AES (Agilent 730C).

(2) Fe Amount of Particle Outer Portion

A powder sample was combined with 50 wt % of aqua regia and heated at 170° C. for 2 hours for dissolution. This is followed by cooling, static holding, and filtration. The filtrate is analyzed by ICP-AES (Agilent 730C).

Fe amount of particle inner portion=(total Fe amount)−(Fe amount of outer portion)    (3)

From these amounts, the iron contents (weight basis) of inner and outer portions of particles are computed.

The silicon oxide particle powder should preferably have an average particle size of 0.1 to 30 μm, more preferably 0.2 to 20 μm. Setting the average particle size of silicon oxide powder to at least 0.1 μm prevents the powder from increasing its specific surface area to increase a proportion of silicon dioxide on particle surface. This concomitantly suppresses any reduction of a cell capacity when the powder is used as active material in the negative electrode of a nonaqueous electrolyte secondary battery. The setting also prevents the powder from reducing its bulk density and hence, prevents any drop of charge/discharge capacity per unit volume. In addition, such silicon oxide powder is easy to prepare and a negative electrode may be easily formed therefrom. Setting the average particle size of silicon oxide powder to at most 30 μm prevents the powder from becoming foreign particles when coated on an electrode and adversely affecting cell properties. In addition, a negative electrode may be easily formed and the risk of separation from the current collector (e.g., copper foil) is minimized. It is noted that the "average particle size" as used herein is a particle diameter (median diameter) corresponding to a cumulative weight of 50% in particle size distribution measurement by laser light diffractometry.

The silicon oxide particles should preferably have a BET specific surface area of 0.5 to 30 $m^2/g$, more preferably 1 to 20 $m^2/g$. A surface area of at least 0.5 $m^2/g$ ensures a high surface activity and allows a binder to exhibit a bond strength during electrode fabrication, leading to improved cycle performance upon repetition of charge/discharge cycles. A surface area of up to 30 $m^2/g$ is effective for preventing a proportion of silicon dioxide on particle surface from increasing to reduce the cell capacity when used as active material in a lithium ion secondary battery negative electrode, suppressing any increase of the amount of solvent absorbed during electrode fabrication, and eliminating a need to add a large amount of binder to maintain bond strength, with a concomitant reduction of conductivity causing deterioration of cycle performance. It is noted that the "BET specific surface area" as used herein is a value measured by the BET single-point method of evaluating an amount of $N_2$ gas adsorbed.

In one embodiment, the silicon oxide particles may be prepared by providing a feed material capable of generating SiO gas and having an iron content of 100 to 20,000 ppm, heating the feed material in an inert gas under normal or reduced pressure at a temperature in the range of 1,100 to 1,600° C. to generate a SiO gas, cooling the gas for effecting precipitation or deposition, and grinding the deposit in a grinding machine devoid of iron contamination.

The SiO gas-providing feed material having an iron content of 100 to 20,000 ppm is not particularly limited as long as it is capable of generating SiO gas. Most often, a mixture of a silicon dioxide ($SiO_2$) powder and a reducing powder is used. Examples of the reducing powder include metal silicon compounds and carbon-containing powders. Inter alia, a metal silicon powder is preferably used because of higher reactivity and yield.

From a mixture of a silicon dioxide powder and a metal silicon powder which ensures a high reactivity and yield, SiO gas may be efficiently generated. By starting with such a powder mixture as the SiO gas-providing feed material, silicon oxide particles can be prepared at a high productivity, which particles may be used as negative electrode active material to construct a nonaqueous electrolyte secondary battery with a high capacity and improved cycle performance. Additionally, iron (Fe) present in the feed material serves as catalyst, leading to an improved productivity and a reduction of preparation cost. Thus the inventive silicon oxide can be prepared in high yields. For the mixture of a silicon dioxide powder and a metal silicon powder, any suitable mixing ratio may be selected. Preferably, the metal silicon powder and the silicon dioxide powder are mixed in a molar ratio in the range: 1<metal silicon powder/silicon dioxide powder<1.1, and more preferably in the range: 1.01=metal silicon powder/silicon dioxide powder=1.08, when the presence of surface oxygen on the metal silicon powder and trace oxygen in the reactor furnace is taken into account.

The silicon dioxide powder used herein should preferably have an average particle size of up to 0.1 μm, more preferably 0.005 to 0.1 μm, and even more preferably 0.005 to 0.08 μm. The metal silicon powder used herein should preferably have an average particle size of up to 30 μm, more preferably 0.05 to 30 μm, and even more preferably 0.1 to 20 μm. If the average particle size of silicon dioxide powder exceeds 0.1 μm, or if the average particle size of metal silicon powder exceeds 30 μm, then reactivity and/or productivity may decline.

It is critical that the iron content of the SiO gas-providing feed material be 100 to 20,000 ppm. The iron content is preferably 200 to 15,000 ppm, and more preferably 250 to 13,000 ppm. If the feed material has a Fe content of less than 100 ppm, the resulting silicon oxide particles may have an inner portion Fe content of less than 10 ppm, which are outside the scope of the invention. If the feed material has a Fe content in excess of 20,000 ppm, the resulting silicon oxide particles may have an inner portion Fe content of more than 1,000 ppm, which are also outside the scope of the invention. The inclusion of iron in the feed material in the specific range is advantageous from the aspects of productivity improvement and cost reduction because Fe serves as catalyst to enhance reaction rate.

The iron content may be adjusted by any desired means, for example, by adding a certain amount of iron or an iron compound or by selecting iron-containing metallic silicon. Typically, it is simple to select and use chemical grade metallic silicon.

In one embodiment, the SiO gas-providing feed material is heated in an inert gas under normal or reduced pressure at a temperature in the range of 1,100 to 1,600° C. to generate a SiO gas, and the gas is then cooled for effecting precipitation or deposition, obtaining a precipitate or deposit. A heating temperature below 1,100° C. is too low for reaction to proceed, leading to a reduced emission of SiO gas and hence, a substantially reduced yield. If the heating temperature exceeds 1,600° C., problems arise that the feed is powder mixture can be melted to interfere with reactivity and reduce the emission of SiO gas and a choice of the reactor material is difficult. For this reason, the heating temperature is in the range of 1,100 to 1,600° C. The presence of an inert gas which may be under atmospheric or reduced pressure is essential during the heating step, because otherwise the SiO gas once generated becomes unstable, and the reaction efficiency of silicon oxide is reduced, both leading to a reduced yield.

Upon cooling, the SiO gas precipitates as a deposit. The gas may be cooled by any desired means, for example, by introducing the gas in a cooling zone to deposit on a substrate, or by spraying the gas into a cooling atmosphere. In one typical means, the mix gas flows in a cooling zone where the gas deposits on a substrate. Although the material of the substrate for deposition is not particularly limited, high-melting point metals such as stainless steel, molybdenum, tungsten and alloys thereof are preferably used for ease of working. The cooling zone is preferably at a temperature of 500 to 1,000° C., more preferably 700 to 950° C. A deposition temperature of at least 500° C. makes it easy to prevent the reaction product from increasing its BET surface area beyond 30 m²/g. If the deposition temperature is equal to or lower than 1,000° C., a choice of the substrate material is easy and the deposition apparatus may be of low cost. The temperature of the deposition substrate may be controlled by heater power, thermal insulation ability (e.g., insulating wall thickness), forced cooling, or the like.

If necessary, the deposit may be ground to any desired particle size by well-known means. Typically, the deposit is ground to the desired particle size by a grinding machine devoid of iron contamination. As used herein, the "grinding machine devoid of iron contamination" is a grinding machine comprising a grinding section and a contact section both made of an iron-free material. Although the iron-free material is not particularly limited, preference is given to ceramic materials including alumina, zirconia, SiAlON, silicon carbide, and silicon nitride based materials. By grinding the deposit to the desired particle size on a grinding machine devoid of iron contamination, particles are obtained in which the iron content of particle outer portion is equal to or less than 30 ppm.

To impart electroconductivity to the resulting silicon oxide particles, carbon may be deposited or coated thereon by chemical vapor deposition or mechanical alloying. When carbon coating is employed, the coverage (or coating weight) of carbon is preferably 1 to 50% by weight, more preferably 1 to 30% by weight based on the total weight of carbon-coated silicon oxide particles.

The chemical vapor deposition of carbon may be conducted by introducing a hydrocarbon base compound gas and/or vapor into a deposition reactor chamber at a temperature in the range of 600 to 1,200° C., preferably 800 to 1,100° C. and under atmospheric or reduced pressure, where thermal chemical vapor deposition takes place in a well-known manner. It is also acceptable to form silicon composite particles in which a silicon carbide layer is formed at the silicon-carbon layer interface. The hydrocarbon base compound used herein is thermally decomposed at the indicated temperature to form carbon. Examples of the hydrocarbon base compound include hydrocarbons such as methane, ethane, propane, butane, pentane, hexane, ethylene, propylene, butylene, and acetylene, alone or in admixture; alcohol compounds such as methanol and ethanol; mono- to tri-cyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene, alone or in admixture, and mixtures of the foregoing. Also, gas light oil, creosote oil and anthracene oil obtained from the tar distillation step are useful as well as naphtha cracked tar oil, alone or in admixture.

The silicon oxide particles thus obtained are suitable as negative electrode active material for use in nonaqueous electrolyte secondary batteries. Using the silicon oxide particles as active material, a negative electrode suitable for use in nonaqueous electrolyte secondary batteries may be prepared. Since the nonaqueous electrolyte secondary battery constructed using the negative electrode exerts good cycle performance while maintaining a high battery capacity and a low volume expansion inherent to silicon oxide, it is best suited in the automotive application where these properties are required.

In another aspect, the invention provides a lithium ion secondary battery comprising a positive electrode, a negative electrode, and a lithium ion-conducting nonaqueous electrolyte, the negative electrode comprising the inventive silicon oxide particles as active material. The lithium ion secondary battery using the inventive silicon oxide particles as active material in its negative electrode exhibits good battery properties such as charge/discharge capacity and cycle performance.

When a negative electrode is prepared from a negative electrode material comprising the inventive silicon oxide particles, a conductive agent such as graphite may be added to the negative electrode material. The type of conductive agent used herein is not particularly limited as long as it is an electronic conductive material which does not undergo decomposition or alteration in the battery. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins.

The negative electrode is prepared by combining the silicon oxide particles with a binder such as polyimide resin or aromatic polyimide resin, a conductive agent as mentioned above and additives, kneading them in a solvent such as N-methylpyrrolidone or water to form a paste-like mix, and applying the mix in sheet form to a current collector. The current collector used herein may be a foil of any material which is commonly used as the negative electrode current collector, for example, a copper or nickel foil while the thickness and surface treatment thereof are not particularly limited. The method of shaping or molding the mix into a sheet is not particularly limited, and any well-known method may be used.

The lithium ion secondary battery is characterized by the use of the negative electrode material comprising the inventive silicon oxide particles as active material while the materials of the positive electrode, electrolyte, and separator and the battery design may be well-known ones and are not particularly limited. For example, the positive electrode active material used herein may be selected from transition metal oxides such as $LiCoO_2$, $LiNiO_2$, $LiMn_2O_4$, $V_2O_5$, $MnO_2$, $TiS_2$ and $MoS_2$, and chalcogen compounds. The electrolytes used herein may be lithium salts such as lithium perchlorate in nonaqueous solution form. Examples of the nonaqueous solvent include propylene carbonate, ethylene carbonate, dimethoxyethane, γ-butyrolactone and 2-methyl-tetrahydrofuran, alone or in admixture. Use may also be made of other various nonaqueous electrolytes and solid electrolytes.

The separator disposed between positive and negative electrodes is not particularly limited as long as it is stable to the electrolyte liquid and effectively retains the liquid. Often, porous sheets or non-woven fabrics of polyolefins such as polyethylene and polypropylene, copolymers thereof, and aramide resins are used. They may be used as a single layer or a laminate of multiple layers while they may be surface covered with a layer of ceramic material such as metal oxide. Porous glass or ceramic material may also be used.

In a further aspect, the invention provides an electrochemical capacitor comprising a positive electrode, a negative electrode, and a conductive electrolyte, the negative electrode comprising the inventive silicon oxide particles as active material. The electrochemical capacitor using the inventive silicon oxide particles as active material in its negative electrode exhibits good capacitor properties such as charge/discharge capacity and cycle performance. The electrochemical capacitor is characterized by the negative electrode comprising the silicon oxide active material defined herein, while other materials such as electrolyte and separator and capacitor design are not particularly limited. Examples of the electrolyte used herein include nonaqueous solutions of lithium salts such as lithium hexafluorophosphate, lithium perchlorate, lithium borofluoride, and lithium hexafluoroarsenate. Exemplary nonaqueous solvents include propylene carbonate, ethylene carbonate, dimethyl carbonate, diethyl carbonate, dimethoxyethane, γ-butyrolactone, and 2-methyltetrahydrofuran, alone or a combination of two or more. Other various nonaqueous electrolytes and solid electrolytes may also be used.

EXAMPLE

Examples and Comparative Examples are given below for further illustrating the invention although the invention is not limited thereto.

Example 1

Silicon oxide was produced using a horizontal tubular furnace as shown in FIG. 1. A reactor tube 4 of alumina having an inner diameter of 80 mm was coupled with a heater 1 and a vacuum pump 5 and a substrate 3 was disposed therein. A feed material was prepared by mixing equimolar amounts of chemical grade metallic silicon powder having an average particle size of 5 μm and a Fe content of 2,000 ppm and fumed silica powder having a BET specific surface area of 200 $m^2$/g and a Fe content of 0 ppm. The reactor tube 4 was charged with 50 g of the feed material 2. Notably, the feed material had a Fe content of 640 ppm.

Then the reactor tube 4 was evacuated to a reduced pressure of 20 Pa or lower by the vacuum pump 5 while it was heated up to 1,400° C. at a rate of 300° C./hr by the heater 1. The tube 4 was held at the temperature for 3 hours. With the heater 1 turned off, the tube was cooled to room temperature.

On cooling, the gas precipitated on the substrate 3 as a black mass deposit. The deposit was recovered 38 g while 4.8 g of a reaction residue was left (conversion degree 90.4%). A 30-g portion of the deposit was dry ground in a 2-L ball mill of alumina, yielding silicon oxide particles. The silicon oxide particles obtained were measured for average particle size and BET specific surface area. The production conditions are tabulated in Table 1 and the measurement results are shown in Table 2.

[Cell Test]

The silicon oxide particles were treated as follows before a battery was constructed using the particles as negative electrode active material. The battery was evaluated for performance.

First, the silicon oxide particles were combined with 45 wt % of artificial graphite having an average particle size of 10 μm and 10 wt % of polyimide. Further N-methylpyrrolidone was added thereto to form a slurry. The slurry was coated onto a copper foil of 12 μm thick, dried at 80° C. for 1 hour, and pressure formed into an electrode by a roller press. The electrode was vacuum dried at 350° C. for 1 hour, and punched into a piece of 2 $cm^2$ which served as a negative electrode.

To evaluate the charge/discharge performance of the negative electrode, a test lithium ion secondary cell was constructed using a lithium foil as the counter electrode. The electrolyte used was a nonaqueous electrolyte solution of lithium hexafluorophosphate in a 1/1 (by volume) mixture of ethylene carbonate and diethyl carbonate in a concentration of 1 mol/liter. The separator used was a microporous polyethylene film of 30 μm thick.

The lithium ion secondary cell thus constructed was allowed to stand overnight at room temperature. Using a secondary cell charge/discharge tester (Nagano K.K.), a charge/discharge test was carried out on the cell. Charging was conducted with a constant current flow of 0.5 mA/cm$^2$ until the voltage of the test cell reached 0 V, and after reaching 0 V, continued with a reduced current flow so that the cell voltage was kept at 0 V, and terminated when the current flow decreased below 40 μA/cm$^2$. Discharging was conducted with a constant current flow of 0.5 mA/cm$^2$ and terminated when the cell voltage rose above 2.0 V, from which a discharge capacity was determined.

By repeating the above operation, the charge/discharge test was carried out 50 cycles on the lithium ion secondary cell. The discharge capacity was evaluated after 50 cycles. The results of the cell test are shown in Table 2.

Example 2

Silicon oxide particles were produced as in Example 1 aside from using ceramic grade metallic silicon powder having a Fe content of 400 ppm as the metallic silicon powder. As in Example 1, particle physical properties and cell performance were evaluated. The production conditions are tabulated in Table 1 and the measurement results shown in Table 2.

Example 3

Silicon oxide particles were produced as in Example 1 except that 5 wt % of iron powder under #325 was added to the equimolar mixture of chemical grade metallic silicon powder having a Fe content of 2,000 ppm and fumed silica powder having a BET surface area of 200 m$^2$/g and a Fe content of 0 ppm. As in Example 1, particle physical properties and cell performance were evaluated. The production conditions are tabulated in Table 1 and the measurement results shown in Table 2.

Example 4

A solution of 3 g of iron nitrate nonahydrate in 500 mL of methanol was prepared. To the solution was added 100 g of fumed silica powder having a BET surface area of 200 m$^2$/g (used in Examples 1 to 3). With stirring and mixing, the fumed silica was treated for about 2 hours. The treated liquid was filtered. On drying, there was obtained Fe-bearing fumed silica powder. On analysis, the fumed silica powder had a Fe content of 3,500 ppm.

Silicon oxide particles were produced as in Example 1 aside from using this fumed silica. As in Example 1, particle physical properties and cell performance were evaluated. The production conditions are tabulated in Table 1 and the measurement results shown in Table 2.

Comparative Example 1

Silicon oxide particles were produced as in Example 1 except that the metallic silicon in the feed material was obtained by treating the ceramic grade metallic silicon powder having a Fe content of 400 ppm (used in Example 2) with hydrochloric acid, washing with water, filtering and drying. As in Example 1, particle physical properties and cell performance were evaluated. The production conditions are tabulated in Table 1 and the measurement results shown in Table 2.

Comparative Example 2

Silicon oxide particles were produced as in Example 1 except that the metallic silicon in the feed material was a semiconductor grade metallic silicon powder having a Fe content of 0 ppm. As in Example 1, particle physical properties and cell performance were evaluated. The production conditions are tabulated in Table 1 and the measurement results shown in Table 2.

Comparative Example 3

Silicon oxide particles were produced as in Example 1 except that 10 wt % of iron powder under #325 was added to the equimolar mixture of chemical grade metallic silicon powder having a Fe content of 2,000 ppm and fumed silica powder having a BET surface area of 200 m$^2$/g and a Fe content of 0 ppm. As in Example 1, particle physical properties and cell performance were evaluated. The production conditions are tabulated in Table 1 and the measurement results shown in Table 2.

Comparative Example 4

Silicon oxide particles were produced as in Example 1 except that the deposit obtained in Example 1 was dry ground in a 2-L ball mill of steel for particle size tailoring. As in Example 1, particle physical properties and cell performance were evaluated. The production conditions are tabulated in Table 1 and the measurement results shown in Table 2.

TABLE 1

|  |  | Metallic silicon powder | | Silicon oxide powder | Fe content (ppm) of powder mixture | Grinding technique |
|---|---|---|---|---|---|---|
|  |  | Grade | Fe content (ppm) | | | |
| Example | 1 | Chemical | 2,000 | fumed silica (Fe = 0 ppm) | 640 | ball mill of alumina |
|  | 2 | Ceramic | 400 | fumed silica (Fe = 0 ppm) | 130 | ball mill of alumina |
|  | 3 | Chemical + Fe 5% | 52,000 | fumed silica (Fe = 0 ppm) | 16,500 | ball mill of alumina |
|  | 4 | Chemical | 2,000 | fumed silica (Fe = 3,500 ppm) | 3,000 | ball mill of alumina |

TABLE 1-continued

|  |  | Metallic silicon powder |  | Silicon oxide powder | Fe content (ppm) of powder mixture | Grinding technique |
|---|---|---|---|---|---|---|
|  |  | Grade | Fe content (ppm) |  |  |  |
| Comparative Example | 1 | Ceramic, HCl treated | 77 | fumed silica (Fe = 0 ppm) | 25 | ball mill of alumina |
|  | 2 | Semiconductor | 0 | fumed silica (Fe = 0 ppm) | 0 | ball mill of alumina |
|  | 3 | Chemical + Fe 10% | 102,000 | fumed silica (Fe = 0 ppm) | 32,500 | ball mill of alumina |
|  | 4 | Chemical | 2,000 | fumed silica (Fe = 0 ppm) | 640 | ball mill of steel |

TABLE 2

|  |  | Reaction residue | | Physical properties of silicon oxide particles | | | | Initial cell performance | | 50-th cycle cell performance | |
|---|---|---|---|---|---|---|---|---|---|---|---|
|  |  | Amount (g) | Conversion degree (%) | Average particle size (μm) | BET surface area (m²/g) | Outer Fe content (ppm) | Inner Fe content (ppm) | Charge capacity (mAh/g) | Discharge capacity (mAh/g) | Charge capacity (mAh/g) | Cycle retentivity (%) |
| Example | 1 | 4.8 | 90.4 | 5.2 | 6.1 | 5 | 73 | 1,320 | 1,010 | 980 | 97 |
|  | 2 | 5.1 | 89.8 | 5.3 | 6.3 | 4 | 15 | 1,320 | 1,010 | 980 | 97 |
|  | 3 | 0.5 | 99.0 | 5.3 | 5.7 | 5 | 850 | 1,290 | 980 | 950 | 97 |
|  | 4 | 1.5 | 97.0 | 5.3 | 6.0 | 5 | 160 | 1,310 | 1,000 | 970 | 97 |
| Comparative Example | 1 | 8.2 | 83.6 | 5.2 | 6.4 | 5 | 7 | 1,310 | 980 | 920 | 94 |
|  | 2 | 10.5 | 79.0 | 5.2 | 6.5 | 4 | 0 | 1,300 | 970 | 900 | 93 |
|  | 3 | 0.5 | 99.0 | 5.3 | 5.8 | 4 | 1,800 | 1,250 | 930 | 900 | 97 |
|  | 4 | 4.8 | 90.4 | 5.2 | 6.3 | 150 | 850 | 1,320 | 1,010 | 980 | 97 |

As shown in Table 2, the silicon oxide particles produced by the method of Example 1 had an average particle size of 5.2 μm, a BET surface area of 6.1 m²/g, an outer Fe content of 5 ppm, and an inner Fe content of 73 ppm. The silicon oxide particles of Example 2 had an average particle size of 5.3 μm, a BET surface area of 6.3 m²/g, an outer Fe content of 4 ppm, and an inner Fe content of 15 ppm. The silicon oxide particles of Example 3 had an average particle size of 5.3 μm, a BET surface area of 5.7 m²/g, an outer Fe content of 5 ppm, and an inner Fe content of 850 ppm. The silicon oxide particles of Example 4 had an average particle size of 5.3 μm, a BET surface area of 6.0 m²/g, an outer Fe content of 5 ppm, and an inner Fe content of 160 ppm.

In contrast, the silicon oxide particles of Comparative Example 1 had an average particle size of 5.2 μm, a BET surface area of 6.4 m²/g, an outer Fe content of 5 ppm, and an inner Fe content of 7 ppm. The silicon oxide particles of Comparative Example 2 had an average particle size of 5.2 μm, a BET surface area of 6.5 m²/g, an outer Fe content of 4 ppm, and an inner Fe content of 0 ppm. The silicon oxide particles of Comparative Example 3 had an average particle size of 5.3 μm, a BET surface area of 5.8 m²/g, an outer Fe content of 4 ppm, and an inner Fe content of 1,800 ppm. The silicon oxide particles of Comparative Example 4 had an average particle size of 5.2 μm, a BET surface area of 6.3 m²/g, an outer Fe content of 150 ppm, and an inner Fe content of 850 ppm.

As also shown in Table 2, the lithium ion secondary cell having a negative electrode made of a material using the silicon oxide particles of Example 1 marked an initial charge capacity of 1,320 mAh/g, an initial discharge capacity of 1,010 mAh/g, a 50-th cycle discharge capacity of 980 mAh/g, and a cycle retentivity of 97% after 50 cycles. The cell had a high capacity and improved cycle performance.

The lithium ion secondary cell using the silicon oxide particles of Example 2 marked an initial charge capacity of 1,320 mAh/g, an initial discharge capacity of 1,010 mAh/g, a 50-th cycle discharge capacity of 980 mAh/g, and a cycle retentivity of 97% after 50 cycles. The cell had a high capacity and improved cycle performance like Example 1.

The lithium ion secondary cell using the silicon oxide particles of Example 3 marked an initial charge capacity of 1,290 mAh/g, an initial discharge capacity of 980 mAh/g, a 50-th cycle discharge capacity of 950 mAh/g, and a cycle retentivity of 97% after 50 cycles. The cell had a high capacity and improved cycle performance like Examples 1 and 2.

The lithium ion secondary cell using the silicon oxide particles of Example 4 marked an initial charge capacity of 1,310 mAh/g, an initial discharge capacity of 1,000 mAh/g, a 50-th cycle discharge capacity of 970 mAh/g, and a cycle retentivity of 97% after 50 cycles. The cell had a high capacity and improved cycle performance like Examples 1 to 3.

In contrast, the lithium ion secondary cell using the silicon oxide particles of Comparative Example 1 marked an initial charge capacity of 1,310 mAh/g, an initial discharge capacity of 980 mAh/g, a 50-th cycle discharge capacity of 920 mAh/g, and a cycle retentivity of 94% after 50 cycles. The cell showed inferior cycle performance due to a low inner Fe content as compared with the use of silicon oxide particles of Examples 1 to 4. In addition, since the feed material contained no iron, the conversion degree was as low as 83.6%, indicating poor reactivity.

The lithium ion secondary cell using the silicon oxide particles of Comparative Example 2 marked an initial charge capacity of 1,300 mAh/g, an initial discharge capacity of 970 mAh/g, a 50-th cycle discharge capacity of 900 mAh/g, and a cycle retentivity of 93% after 50 cycles. The cell showed a low capacity as compared with the use of silicon oxide particles of Examples 1 to 4. In addition, since the feed material contained no iron, the conversion degree was as low as 79.0%, indicating poor reactivity.

The lithium ion secondary cell using the silicon oxide particles of Comparative Example 3 marked an initial charge capacity of 1,250 mAh/g, an initial discharge capacity of 930 mAh/g, a 50-th cycle discharge capacity of 900 mAh/g, and a cycle retentivity of 97% after 50 cycles. The cell showed a low capacity as compared with the use of silicon oxide particles of Examples 1 to 4.

The lithium ion secondary cell using the silicon oxide particles of Comparative Example 4 marked an initial charge capacity of 1,320 mAh/g, an initial discharge capacity of 1,010 mAh/g, a 50-th cycle discharge capacity of 980 mAh/g, and a cycle retentivity of 97% after 50 cycles. The cell had equivalent battery properties to the use of silicon oxide particles of Examples 1 to 4. When the number of cell operating cycles exceeded 300 cycles, a short-circuit fault occurred between electrodes, giving off white fumes. The cell could be no longer used. It was demonstrated that the lithium ion secondary cell of Comparative Example 4 lacked safety for practical service.

Notably, the lithium ion secondary cells using the silicon oxide particles of Examples 1 to 4 ensured continuous charge/discharge operation even over 300 cycles.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

Japanese Patent Application No. 2012-112405 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A lithium ion secondary battery comprising a positive electrode, a negative electrode, and a lithium ion-conducting nonaqueous electrolyte, said negative electrode comprising a silicon oxide particles as negative electrode active material having an average particle size of 0.1 to 30 μm and a BET specific surface area of 0.5 to 30 $m^2/g$, wherein a first iron content of inner portion of the silicon oxide particles is 15 to 1,000 ppm, and a second iron content of outer portion of the silicon oxide particles is 4 to 10 ppm, and wherein the inner portion is different from the outer portion.

2. The lithium ion secondary battery of claim 1, the second iron content of outer portion of the silicon oxide particles is determined by a method where a powder sample is mixed with 50% by weight of aqua regia and heated at 170° C. for dissolution, followed by cooling, static holding, and filtration, and obtained filtrate is analyzed by ICP-AES to determine the second iron content of outer portion of the silicon oxide particles, and the first iron content of inner portion of the silicon oxide particles is determined by a method, where a total iron content of particles is measured by adding 50% by weight of hydrofluoric acid to a powder sample, once reaction begins, 50% by weight of nitric acid is further added to obtain a liquid, the liquid is heated at 200° C. until complete melting, the liquid is analyzed by ICP-AES to determine the total iron content of particles, and then the first iron content of inner portion of the silicon oxide particles is determined by subtracting the second iron amount of outer portion from the total amount ((the total iron content)–(the second iron content of outer portion of the silicon oxide particles)).

3. The lithium ion secondary battery of claim 1, wherein the first iron content of inner portion of the silicon oxide particles is 20 to 800 ppm.

4. The lithium ion secondary battery of claim 1, wherein the first iron content of inner portion of the silicon oxide particles is 15 to 850 ppm, and the second iron content of outer portion of the silicon oxide particles is 4 to 5 ppm.

* * * * *